United States Patent
Tschofenig et al.

(10) Patent No.: US 11,949,664 B2
(45) Date of Patent: Apr. 2, 2024

(54) MACHINE TO MACHINE COMMUNICATIONS

(71) Applicants: Arm Limited, Cambridge (GB); Arm IP Limited, Cambridge (GB)

(72) Inventors: Hannes Tschofenig, Tirol (AT); Mikko Johannes Saarnivala, Oulu (FI); Szymon Sasin, Oulu (FI)

(73) Assignees: Arm Limited, Cambridge (GB); Arm IP Limited, Cambridge (GB)

( * ) Notice: Subject to any disclaimer, the term of this patent is extended or adjusted under 35 U.S.C. 154(b) by 323 days.

(21) Appl. No.: 17/595,066

(22) PCT Filed: Feb. 7, 2020

(86) PCT No.: PCT/GB2020/050279
§ 371 (c)(1),
(2) Date: Nov. 8, 2021

(87) PCT Pub. No.: WO2020/229788
PCT Pub. Date: Nov. 19, 2020

(65) Prior Publication Data
US 2022/0200967 A1    Jun. 23, 2022

Related U.S. Application Data

(60) Provisional application No. 62/846,052, filed on May 10, 2019.

(30) Foreign Application Priority Data

Nov. 29, 2019    (GB) .................................... 1917404

(51) Int. Cl.
*H04L 9/40*    (2022.01)
*H04L 67/141*    (2022.01)
*H04L 67/146*    (2022.01)

(52) U.S. Cl.
CPC .............. *H04L 63/04* (2013.01); *H04L 63/08* (2013.01); *H04L 67/141* (2013.01); *H04L 67/146* (2013.01)

(58) Field of Classification Search
None
See application file for complete search history.

(56) References Cited

U.S. PATENT DOCUMENTS

| 7,778,194 B1 | 8/2010 | Yung | |
|---|---|---|---|
| 2019/0007836 A1 | 1/2019 | Ocak | |
| 2022/0182799 A1* | 6/2022 | Zhang | H04W 4/14 |

FOREIGN PATENT DOCUMENTS

| DE | 102017210721 | 12/2018 |
|---|---|---|
| WO | WO2009055802 | 4/2009 |
| WO | WO2017131564 | 8/2017 |

OTHER PUBLICATIONS

Oma, "Lightweight Machine to Machine Technical Specification: Core", Jun. 2018 (Jun. 1, 2018), pp. 1-142, XP055672047, Retrieved from the Internet: URL:http://openmobilealliance.org/RELEASE/LightweightM2M/V11-20180612-C/OMA-TS-LightweightM2M Core-V1 1-20180612-C.pdf [retrieved-on Feb. 27, 2020] section E.1.

(Continued)

*Primary Examiner* — Cai Y Chen
(74) *Attorney, Agent, or Firm* — DeWitt LLP

(57) ABSTRACT

Broadly speaking, the present techniques relate to a computer implemented method for establishing a secure communication session between a client device and a server, the method performed at the client device comprising: obtaining a security object comprising at least one security credential and server connection data for multiple connection options to a first server, wherein the security credential is to be used for each of the multiple connection options; generating, a first server security universal resource identifier (URI), the first Server Security URI comprising server contact infor- (Continued)

mation for the first server and a first security binding selected from the server connection data; communicating with the first server using the first Server Security URI and the at least one security credential to establish a secure communication session between the client device and the first server.

20 Claims, 12 Drawing Sheets

(56) References Cited

OTHER PUBLICATIONS

"Lightweight Machine to Machine Technical Specification: Transport Bindings", OMA-TS-LightweightM2M Transport-V1 1-20180 710-A, Open Mobile Alliance (OMA),-4330 La Jolla Village Dr., Suite 110 San Diego, CA 92122; USA, Aug. 6, 2018 (Aug. 6, 2018), pp. 1-67, XP064192961, Retrieved from the Internet: URL: ftp/ Public documents/DM/LightweightM2M /Permanent documents/ [retrieved-on Aug. 7, 2018] sections 4., 5.2.4, 5.2.8, 5.2.8.1-5.2.8.4, 6.7.1-6.7.3.
Hannes Tschofenig: "Multiple Transports in LwM2M", OMA-DM &SE-2019-0047-INP Multiple Transports, Open Mobile Alliance-(OMA), 4330 La Jolla Village Dr., Suite 110 San Diego, CA 92122; USA Jul. 17, 2019 (Jul. 17, 2019), pp. 1-7, XP064193562, Retrieved from the Internet: URL:ftp/Public_documents/ DM/2019/ [retrieved on Apr. 22, 2020] the whole document.
Mateusz Krawiec, "Relation of Binding mode and Security instances in LwM2M 1.1 Issue #459 . OpenMobileAlliance/ OMA LwM2M for Developers . GitHub", Mar. 19, 2019 (Mar. 19, 2019), XP055688444, Retrieved from the Internet: URL: https://github.com/ OpenMobileAlliance/ OMA LwM2M for Developers/issues/459 [retrieved on-Apr. 22, 2020] section related to contribution dated Mar. 19, 2019.
International Search Report and Written Opinion corresponding to PCT/GB2020/051093, dated Jun. 25, 2020.
Combined Search and Examination Report corresponding to GB2002697.7, dated Sep. 1, 2020.
Examination Report corresponding to GB2002697.7, dated Jul. 14, 2021.
International Preliminary Report on Patentability corresponding to PCT/GB2020/051093, dated Nov. 25, 2021.
Dierks, T. et al. IETF RFC5246 "The Transport Layer Security (TLS) Protocol Version 1.2", IETF, Aug. 2008.
Eronen, P. IETF RFC 4279 "Pre-Shared Key Ciphersuites for Transport Layer Security (TLS)", The Internet Society, Dec. 2005.
Menzes, A. et al. "Handbook of Applied Cryptography", Published 2001, CRC Press.
Examination Report corresponding to GB1917404.4 dated Feb. 24, 2021.
Combined Search Report and Examination Report corresponding to GB1917404.4 dated May 28, 2020.
International Search Report and Written Opinion corresponding to PCT/GB2020/050279 dated May 4, 2020.
International Preliminary Report on Patentability corresponding to PCT/GB2020/050279 dated Nov. 25, 2021.
Combined Search Report and Examination Report corresponding to GB1901421.6, dated Aug. 1, 2019.
Examination Report corresponding to GB1901421.6 dated Aug. 18, 2020.
Examination Report corresponding to GB1901421.6 dated Apr. 9, 2021.
International Search Report and Written Opinion corresponding to PCT/GB2020/050048 dated Jun. 23, 2020.
International Preliminary Report on Patentability corresponding to PCT/GB2020/050048 dated Aug. 12, 2021.

\* cited by examiner

302

| LwM2M Security Object | Instance #0 |
|---|---|
| LwM2M Server Security URI | coaps://foo.example.com |
| Security Mode | 1 ("RPK") |
| Public Key or Identity | 3059301306072a8648ce3d020106082a8648ce3d03010703420004a09dcb1bc739e7f19afa9adcb1944968bfba73efcec29b50486eb44d1b29c193449970a3736830cb2bd5d7ec05d2bd1fc07b6df5e48b54ce77a6a7229c3a91c2 |
| Server Public Key | 3059301306072a8648ce3d020106082a8648ce3d03010703420004 82c773f378d30c2783a48eb811b96cf6a90694a8564f1e7f6d366152f11687850f6f7c40cda585334f837750a102f5bf25508ceb9e55dfc0f12a455199a4c9 60 |
| Secret Key | 307702010104209f352da16495748e186fcb5370b8e96d292ced5567a8fae55a22bb67d91651b8a00a06082a8648ce3d030107a14403420004a09dcb1bc739e7f19afa9adcb1944968bfba73efcec29b50486eb44d1b29c193449970a3736830cbc2bd5d7ec05d2bd1fc07b6df5e48b54ce77a6a7229c3a91c2 |
| Short Server ID | 102 |

306

| LwM2M Security Object | Instance #0 |
|---|---|
| Short Server ID | 102 |
| Lifetime | 86400 |
| Default Minimum Period | 300 |
| Default Maximum Period | 6000 |
| DisableTimeout | 86400 |
| Binding Preference | e.g. "U" |

| LwM2M Security Object | Instance #1 |
|---|---|
| LwM2M Server Security URI | Coaps+tcp://foo.example.com |
| Security Mode | 1 ("RPK") |
| Public Key or Identity | 3059301306072a8648ce3d020106082a8648ce3d03010703420004a09dcb1bc739e7f19afa9adcb1944968bfba73efcec29b50486eb44d1b29c193449970a3736830cb2bd5d7ec05d2bd1fc07b6df5e48b54ce77a6a7229c3a91c2 |
| Server Public Key | 3059301306072a8648ce3d020106082a8648ce3d0301070342000482c773f378d30c2783a48eb811b96cf6a90694a8564f1e7f6d366152f11687850f6f7c40cda585334f837750a102f5bf25508ceb9e55dfc0f12a455199a4c9 60 |
| Secret Key | 307702010104209f352da16495748e186fcb5370b8e96d292ced5567a8fae55a22bb67d91651b8a00a06082a8648ce3d030107a14403420004a09dcb1bc739e7f19afa9adcb1944968bfba73efcec29b50486eb44d1b29c193449970a3736830cbc2bd5d7ec05d2bd1fc07b6df5e48b54ce77a6a7229c3a91c2 |
| Short Server ID | 102 |

*FIG. 3a Cont'd*

| 308 | |
|---|---|
| LwM2M Security Object | Instance #0 |
| LwM2M Server Security URI | coaps+tcp://foo.example.com |
| Security Mode | 4 ("EST") |
| Public Key or Identity | N/A |
| Server Public Key | 3059301306072a8648ce3d02010 6082a8648ce3d030107034200 0482c773f378d30c2783a48eb811 b96cf6a90694a8564f1e7f6d3661 52f11687850f6f7c40cda585334 f837750a102f5bf25508ceb9e55 dfc0f12a455199a4c9 60 |
| Secret Key | N/A |
| Short Server ID | 102 |

| 312 | |
|---|---|
| LwM2M Security Object | Instance #0 |
| Short Server ID | 102 |
| Lifetime | 86400 |
| Default Minimum Period | 300 |
| Default Maximum Period | 6000 |
| DisableTimeout | 86400 |
| Binding Preference | U |

| 310 | |
|---|---|
| LwM2M Security Object | Instance #1 |
| LwM2M Server Security URI | coaps://foo.example.com |
| Security Mode | 4 ("EST") |
| Public Key or Identity | N/A |
| Server Public Key | 3059301306072a8648ce3d02010 6082a8648ce3d030107034200 0482c773f378d30c2783a48eb811 b96cf6a90694a8564f1e7f6d3661 52f11687850f6f7c40cda585334 f837750a102f5bf25508ceb9e55 dfc0f12a455199a4c9 60 |
| Secret Key | N/A |
| Short Server ID | 102 |

FIG. 3b

MACHINE TO MACHINE COMMUNICATIONS

The present techniques generally relate to communications between a device and a server, such as a server at a device management platform.

There are ever increasing numbers of devices within the home, other buildings or the outdoor environment that have processing and communication capabilities which allow them to communicate with other entities (e.g. devices, servers, services etc.) within the same network or on a different network (e.g. on the internet) to access servers or services as part of the "Internet of Things" (IoT)

For example, a temperature device in a home may gather sensed data and push the sensed data to a remote service (such as an application running in 'the cloud'). The temperature device may then be controlled remotely by the remote service via received command data.

In other examples, a pollution monitoring device in a factory may comprise a sensor to gather information from various chemical sensors and arrange maintenance based on the gathered information; whilst a healthcare provider may use devices comprising sensors, such as a heart rate monitor to track the health of patients while they are at home.

Data is generally transmitted between devices and other entities using machine-to-machine (M2M) communication techniques, and the present applicant has recognised the need for improved (M2M) communication techniques.

According to a first technique there is provided a computer implemented method for establishing a secure communication session between a client device and a server, the method performed at the client device comprising: obtaining a security object comprising a security credential and server connection data for multiple connection options to the server, wherein the security credential is to be used for each of the multiple connection options; selecting, from the server connection data, first server contact information and a first server URI scheme to generate a first server security universal resource identifier (URI); communicating with the server using the first server security URI and the security credential to establish a secure communication session between the client device and the server.

According to a further technique there is provided a computer implemented method for establishing a secure communication session between a client device and a server, the method performed at the server comprising: receiving, from the client device, a first communication comprising a first server security universal resource identifier (URI), the server security URI generated at the client device and comprising server contact information for the server and a first server URI scheme selected from server connection data on the client device; communicating with the client device to establish a secure communication session between the server and the client device.

According to a further technique there is provided a computer implemented method of provisioning data on a client device to enable secure communication session between the client device and a first server, the method performed at a second server comprising: provisioning, at the client device, a security object comprising a security credential and server connection data for multiple connection options to the first server, wherein the security credential is to be used for each of the multiple connection options.

In a hardware approach, there is provided electronic apparatus comprising logic elements operable to implement the methods of the present technology. In another approach, the computer-implemented method may be realised in the form of a computer program product, tangibly stored in a non-transitory storage medium, and operable in use to cause a computer system to perform the process of the present technology.

The techniques are diagrammatically illustrated, by way of example, in the accompanying drawings, in which:

FIGS. 3a & 3b show illustrative examples of known LwM2M security objects;

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Figure 1:
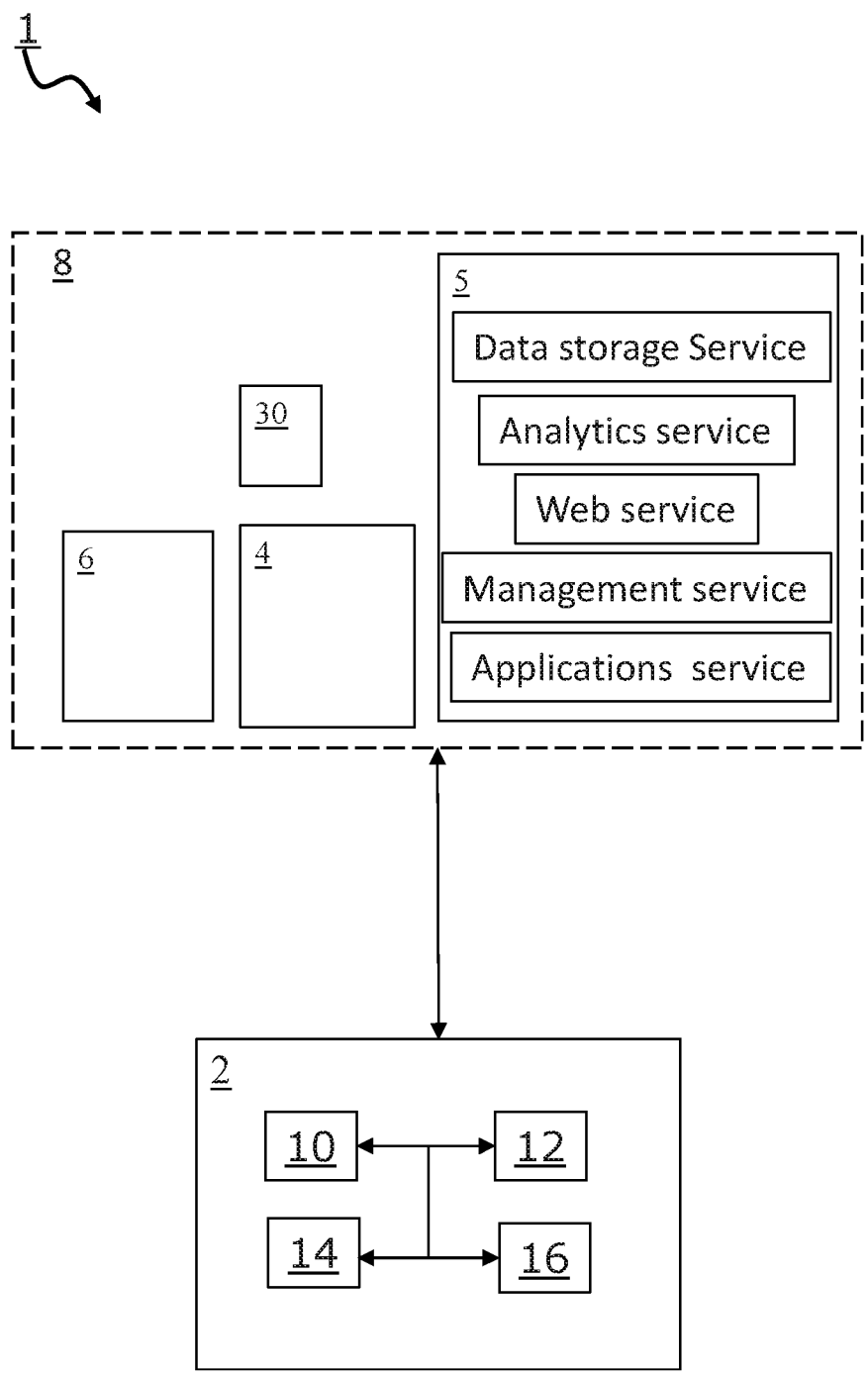
FIG. 1 shows an example deployment scenario for a device according to the present techniques.

FIG. 1 shows a deployment scenario 1 for a device 2 according to the present techniques.

Device 2 may be a computer terminal, a laptop, a tablet or mobile-phone, or may, for example, be a lightweight M2M (LwM2M) device running a LwM2M client. Device 2 can be used to provide smart functionality for streetlights, electric meters, temperature sensors, building automation, healthcare, and a range of other market segments as part of the IoT. It will be appreciated that the examples of market segments listed above are for illustrative purposes only and the claims are not limited in this respect.

Device 2 is operable to communicate with one or more servers and/or services.

As described herein a server (depicted in FIG. 1 as "server 4", "server 6") may be a single computing device or software running on a computing device. However, the claims are not limited in this respect and the server may comprise a plurality of interconnected computing devices (or software running on a plurality of interconnected devices), whereby the plurality of interconnected computing devices may be distributed over one or more public and/or private networks.

In the present figures server 4 may, for example, be a LwM2M server, an application server, an edge server, a computer terminal, a laptop, a tablet or mobile-phone, or an application hosted on a computing device, and which provides deployment of one or more services (depicted in FIG. 1 as "service 5"). Such services may include one or more of: web service(s); data storage service; analytics service(s), management service(s) and application service(s), although this list is not exhaustive.

In the present figures server 6 comprises a bootstrap server which is used to provision, for example, data or information at the device 2. In embodiments, bootstrap server 6 may be any type of server or remote machine and may not necessarily be a dedicated bootstrap server. Generally speaking the bootstrap server 6 is any means suitable to perform a bootstrap process with the device 2 (e.g. machine, hardware, technology, server, software, etc.).

In the present examples, the server 4, bootstrap server 6 and/or services 5 are depicted as being part of a device management platform 8, such as the Pelion™ device management platform from Arm®, Cambridge, UK.

The device 2 comprises communication circuitry 10 for communicating with the one or more servers 4, 6 and/or services 5.

The communication circuitry 10 may use wireless communication such as, for example, one or more of: Wi-Fi; short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination.

It will be appreciated that the device 2 could also use any suitable protocols for communications including one or more of: IPv6, IPv6 over Low Power Wireless Standard (6LoWPAN®), Constrained Application Protocol (CoAP), Message Queuing Telemetry Transport (MQTT), Representational state transfer (REST), User Datagram Protocol (UDP), Transport Control Protocol (TCP), Short Message Service (SMS), HTTP, WebSocket, ZigBee®, Thread® although it will be appreciated that these are examples of suitable protocols.

M2M communications are typically required to be secure to reduce the risk that malicious third parties gain access to the data, or to limit the access to data, by devices, servers or services. The device may use one or more security protocols to establish a secure communications session between entities for providing a secure channel or path for protecting data in communications. The security protocols may require credential data comprising one or more security credentials to establish a secure communications session. Examples of a security credential used in providing a secure communication session may include one or more of: a certificate (e.g. X.509 certificate), a cryptographic key (e.g. a shared symmetric key, public key, private key), whereby such credential data may be used by the device to authenticate (e.g. connect, establish secure communication session, register, enrol etc.) with one or more remote entities (e.g. a bootstrap server/ server/services).

Exemplary security protocols may, for example, comprise Transport Layer Security (TLS) and Datagram Transport Layer Security (DTLS), whereby TLS/DTLS requires various credential data to establish a secure communications session whereby the data in communications protected by TLS/DTLS may be encoded as plain text, binary TLV, JSON, CBOR, or any other suitable data exchange format.

The device 2 further comprises processing circuitry 12 for controlling various processing operations performed by the device 2.

The device 2 may further comprise input/output (I/O) circuitry 14, such that the device 2 can receive inputs (e.g. user inputs, sensor inputs, measurement inputs etc.) and or generate outputs (e.g. audio/visual/control commands etc.).

The device 2 further comprises storage circuitry 16 for storing data whereby the storage circuitry 16 may comprise volatile and/or non-volatile memory.

Figure 2A:
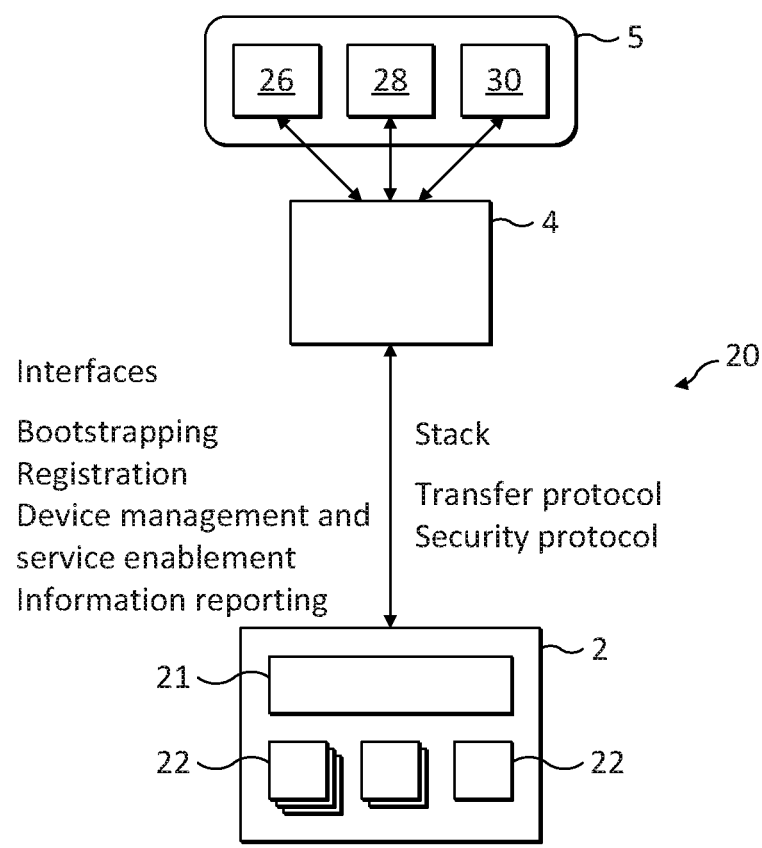
FIG. 2a shows an example architecture depicting a client-server relationship between the device of FIG. 1 and a server.
Figure 2B:
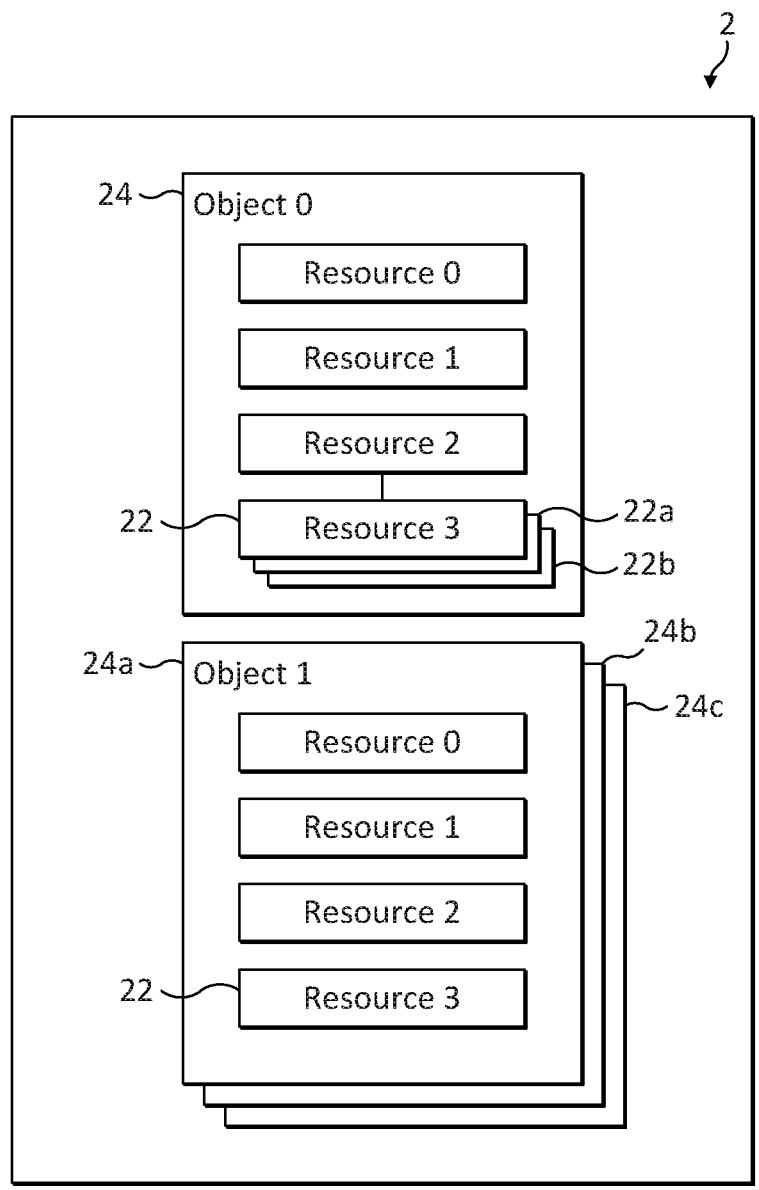
FIG. 2b shows a schematic diagram of an object model on the device of FIG. 1.

FIG. 2a illustratively shows an example architecture 20 which illustrates a client-server relationship between the device 2 and server 4. FIG. 2b illustratively shows a schematic diagram of an object model of device 2.

Device 2 is hereafter referred to as "client device" but may also be referred to herein as a 'device', 'node device', 'node', 'end-user device' or 'user device'.

In the following examples the server 4 is depicted as a LwM2M server, such that the LwM2M server 4 and client device 2 communicate using suitable protocols, such as those in compliance with the Open Mobile Alliance (OMA) LWM2M specification although the claims are not limited in this respect.

The client device 2 comprises client 21 which may be integrated as a software library or a built-in function of a module and which is used in communications with the LwM2M server 4. The client 21 may be an LwM2M client.

Logical interfaces may be defined between the client 21 and LwM2M server 4, and four logical interfaces are depicted in FIG. 2a, namely:

"Bootstrapping" interface enables headless device management, whereby this interface is used to configure the client device to access one or more servers.

'Registration' interface may be used to perform and maintain registration with one or more servers and de-register from one or more servers.

'Device management and service enablement' interface may be used by one or more servers to access object(s), object instances and resources available at the client device 2.

'Information Reporting' interface may be used to enable one or more servers to observe any changes in a resource on client device 2, and for receiving notifications when new values are available.

This list of logical interfaces is exemplary only and additional, or alternative, logical interfaces between the client 21 and LwM2M server 4 may be provided, for example, in accordance with the OMA LwM2M specification.

The device 2 comprises various resources 22, which can be read, written, executed and/or accessed by the LwM2M server 4 or one or more further servers/services.

As an illustrative example, a resource comprises a value (e.g. generated by circuitry on the device). A web application may, via LwM2M server 4, request the value from the client device 2 (e.g. with a REPORT request), whereby the requested value is read and reported back to the web application by the LwM2M server 4.

As a further illustrative example, a resource may comprise credential data provisioned at manufacture (e.g. during a factory provisioning process) or during a communication session with a bootstrap server, and subsequently used to register with the LwM2M server 4.

As depicted in FIG. 2b, the resources 22 may be further logically organized into objects 24, whereby each device 2 can have any number of resources, each of which is associated with a respective object 24.

A set of objects on client device 2 may include, for example:

- A 'security object' to handle security aspects between the client device and a server;
- A 'server object' to define data and functions related to a server;
- An 'access control object' to define for each of one or more permitted servers the access rights the one or more servers have for each object on the client device 2;
- A 'device object' to detail resources on the client device 2. As an example, the device object may detail device information such as manufacturer, model, power information, free memory and error information;
- A 'connectivity monitoring object' to group together resources on the client device 2 that assist in monitoring the status of a network connection;
- A 'firmware update object' enables management of firmware which is to be updated, whereby the object includes installing firmware, updating firmware, and performing actions after updating firmware.;
- A 'location object' to group those resources that provide information about the current location of the client device 2;
- A 'connection statistics object' to group together resources on the client device 2 that hold statistical information about an existing network connection.

In embodiments device 2 may have one or more instances of an object, three of which are depicted for object 1 as 24a, 24b and 24c in FIG. 2b. As an illustrative example, a temperature sensor device may comprise two or more temperature sensors, and the client device 2 may comprise a different device object instance for each temperature sensor.

In embodiments a resource may also comprise one or more resource instances as depicted as 22, 22a, 22b in FIG. 2b.

In embodiments the objects, object instances, resources and resource instances are organised in an object hierarchy where each of the objects, object instances, resources and/or resource instances are elements of the object hierarchy, and whereby the device can enumerate the different elements of an object instance hierarchy using one or more characters (e.g. a text string; alphanumeric text, binary etc.)

Figure 2C:
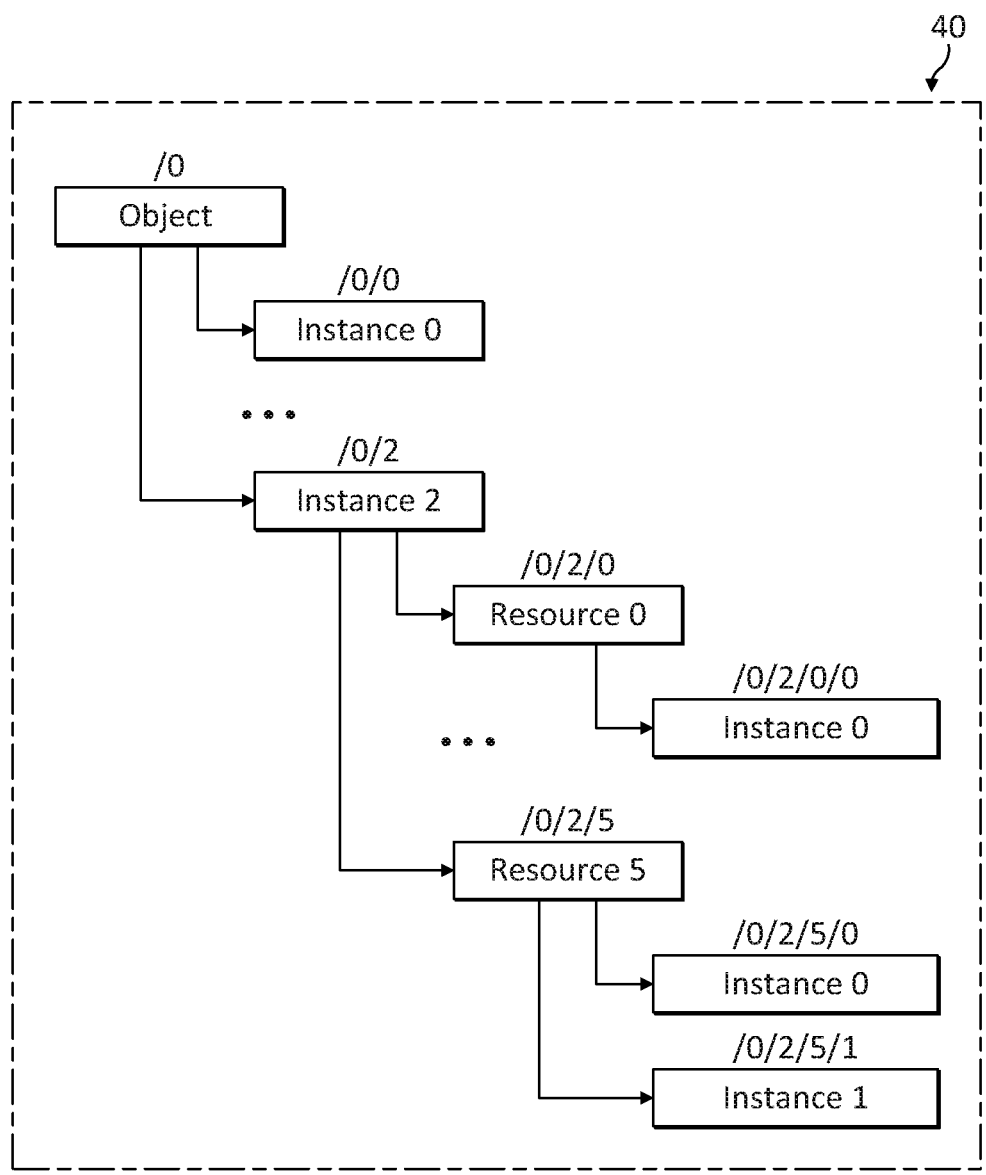

FIG. 2c shows one simplified example of a portion of such an object hierarchy 40, with omissions marked by elision marks ( . . . ). In FIG. 2c, object 0 instance 2 is shown as having a single instance of resource 0 (that is, resource 0 instance 0), and two instances of resource 5 (that is, resource 5 instance 0 and resource 5 instance 1). The elements of the hierarchy are further marked with a hierarchy notation showing the levels and elements within levels using a slash separator. It will be clear to one of ordinary skill in the art that this is merely one example of a hierarchy notation and is not intended to limit the structure of the hierarchies available using the present techniques. It will also be clear to those of skill in the art that real-world implementations of such hierarchies will be much larger, and that only a very simple example has been shown here.

In the hierarchy shown in FIG. 2c, an object may represent an LwM2M object. Instances of such objects are created according to the requirements of the system being implemented. Thus, for example, in a system for monitoring heating and cooling in a group of buildings, a Temperature object may be defined having instances for each of the buildings. The Temperature object instances may be defined to comprise resources, such as a Current Temperature resource, a Maximum Temperature resource and a Minimum Temperature resource, and each resource may further comprise instances for various temperature sensors.

On registration with a server, a device may then enumerate those elements of an object hierarchy which are to be registered using a suitable identifier, such as a universal resource indicator (URI), in the form:

/{Object ID}/{Object Instance}/{Resource ID} e.g. /3/0/1.

As such, the objects, object instances, resources and resource instances on a client device may be remotely accessed/managed by, for example, software hosted on a server (e.g. a bootstrap server, LwM2M server 4) or an application running as part of a service 5.

In an embodiment the LwM2M server 4 comprises, or has access to a resource directory (depicted as resource directory 30 in FIG. 1) at the device management platform 8 (as depicted in FIG. 1), whereby the resources of the various client devices registered with the LwM2M server 4 are stored in the resource directory 30.

Thus, the resource directory 30 is a registry of the elements of the object hierarchy on one or more client devices registered with one or more servers. In embodiments the resource directory 30 may be realized using a processor and a storing device such as a hard disc drive and a suitable application, a database application in a computer or it may be realized using cloud computing.

The LwM2M server 4 registers the device by storing the identified objects, object instances, resources and/or resource instances of the client device in the resource directory 30. Once stored in the resource directory 30 the identified objects, object instances, resources and/or resource instances of the client device can be looked up and accessed as required.

As described above a client device will communicate with a remote server in accordance with one or more connection options.

For example, the client device may communicate with a remote server over one or more protocols. The LwM2M protocol is generally based on CoAP and utilizes the UDP and SMS transport bindings of the protocol. The client device may also have other connection options such as using HTTP, MQTT, Lorawan, NB-IOT utilizing UDP and SMS or TCP, although it will be appreciated that these connection options are exemplary only and the claims are not limited in this respect.

As examples of further connection options, the different protocols may also utilize security bindings to implement authentication, confidentiality, and data integrity features of the protocol between entities, where a security binding specifies the security protocol details and other protocol details (e.g. transport protocol (e.g. TCP, UDP), application protocol etc.) required for the client device and server to securely communicate with each other.

Client devices require credential data comprising at least one security credential to utilise the security protocols and securely communicate with a server (e.g. Bootstrap server/LwM2M server). This credential data is provisioned on the client device as, for example, one or more resources in a security object.

In known systems a client device is provisioned with an individual security object instance for each connection option which the client device supports. Illustrative examples of security objects 302, 304, 306 and 308 are illustratively shown in FIGS. 3a and 3b.

Each security object instance may be provisioned by a bootstrap server e.g. during a bootstrap process.

Each security object instance comprises one or more resources which are used by the client device to establish a secure communications session with a remote server (e.g. LwM2M server/bootstrap server etc.).

Example resources of a security object instance may include an "LwM2M Server security URI" resource; a "Security Mode" resource to define the connection mode or security mode to be used for the connection with the server; a "Public Key or identity" resource; a "Server Public Key" resource and a "Secret Key" resource each specifying credential data; and a "Short Server ID" resource to uniquely identify the server. The client device uses the resources in the security object to communicate with the server in accordance with the security binding defined by the Server Security URI.

The "LwM2M Server security URI" resource specifies an address of the server with which the device communicates and also specifies a security protocol to be used for establishing secure communications with the server 4. For example:
- a LwM2M URI: "coaps://foo.example.com" specifies the address of the server as a Fully Qualified Domain Name (FQDN) and specifies the security binding the client device must use to establish secure communications with the server (i.e. CoAP over DTLS over UDP);
- a LwM2M URI: coaps+tcp://foo.example.com specifies the address of the server as a FQDN and specifies the security binding the client device must use to establish secure communications with the server (i.e. CoAP over TLS over TCP);
- a LwM2M URI: coap+sms://0015105550101 specifies the address of the server as a SMS value and specifies the security binding the client device must use to establish secure communications with the server (i.e. CoAP over DTLS over SMS);
- a LwM2M URI: https://foo.example.com specifies the address of the server as a FQDN and specifies the security binding the client device must use to establish secure communications with the server (HTTP over TLS over TCP).

Furthermore, the "Security Mode" resource in the LwM2M security object determines the types of credential data which is to be provisioned on the client device (e.g. during bootstrapping) for establishing secure communications with the server. Example security modes include:
- pre-shared key mode
- raw public key mode
- certificate mode
- certificate mode with enrollment over secure transport (EST)

Each security mode may be identified by a value in the Security Mode resource. For example: a value of '0' in the Security Mode resource specifies "pre-shared key mode"; a value of '1' in the Security Mode resource specifies "raw public key mode"; a value of '2' in the Security Mode resource specifies "certificate mode"; a value of '3' in the Security Mode resource specifies "No security mode"; and a value of '4' in the Security Mode resource specifies "EST".

In pre-shared key mode, communication between the client device and server is symmetrically encrypted using a common secret pre-shared key shared between the server and the client device. For example, a TLS-PSK identity is stored in the Public Key or Identity resource and is a string identifying the key being used, so that the server can uniquely determine which key to use for communication. The Secret Key resource contains the secret pre-shared key.

In raw public key mode a public key and a private key of the appropriate type and length for the cipher suite negotiated during a handshake are used. These keys are stored as a sequence of binary bytes with the public key stored in the Public Key or Identity resource, and the private key stored in the Secret Key resource.

In certificate mode, an asymmetrical public-key cryptographic algorithm is used to authenticate the client device and server and initialize payload encryption. Appropriate certificates (e.g. public certificates) are generated for each security object using certificate mode on the client device. The Public Key or Identity resource contains the client device's own public certificate (e.g. in binary, DER-encoded X.509 format). The Server Public Key resource contains the server's public certificate (e.g. in binary, DER-encoded X.509 format). The Secret Key resource contains the client device's own private key, corresponding to a public key in the certificate contained in the Public Key or Identity resource.

EST is a certificate management protocol for provisioning certificates from the Bootstrap-Server to the client device. In EST mode the client device generates a key pair locally on the client device. The private key never leaves the client device. The certificate of the LwM2M server is provisioned to the "Server Public Key" resource. EST mode triggers the client device to locally generate a public/private key pair and to initiate an exchange with the server to obtain the certificate.

Figure 3C:
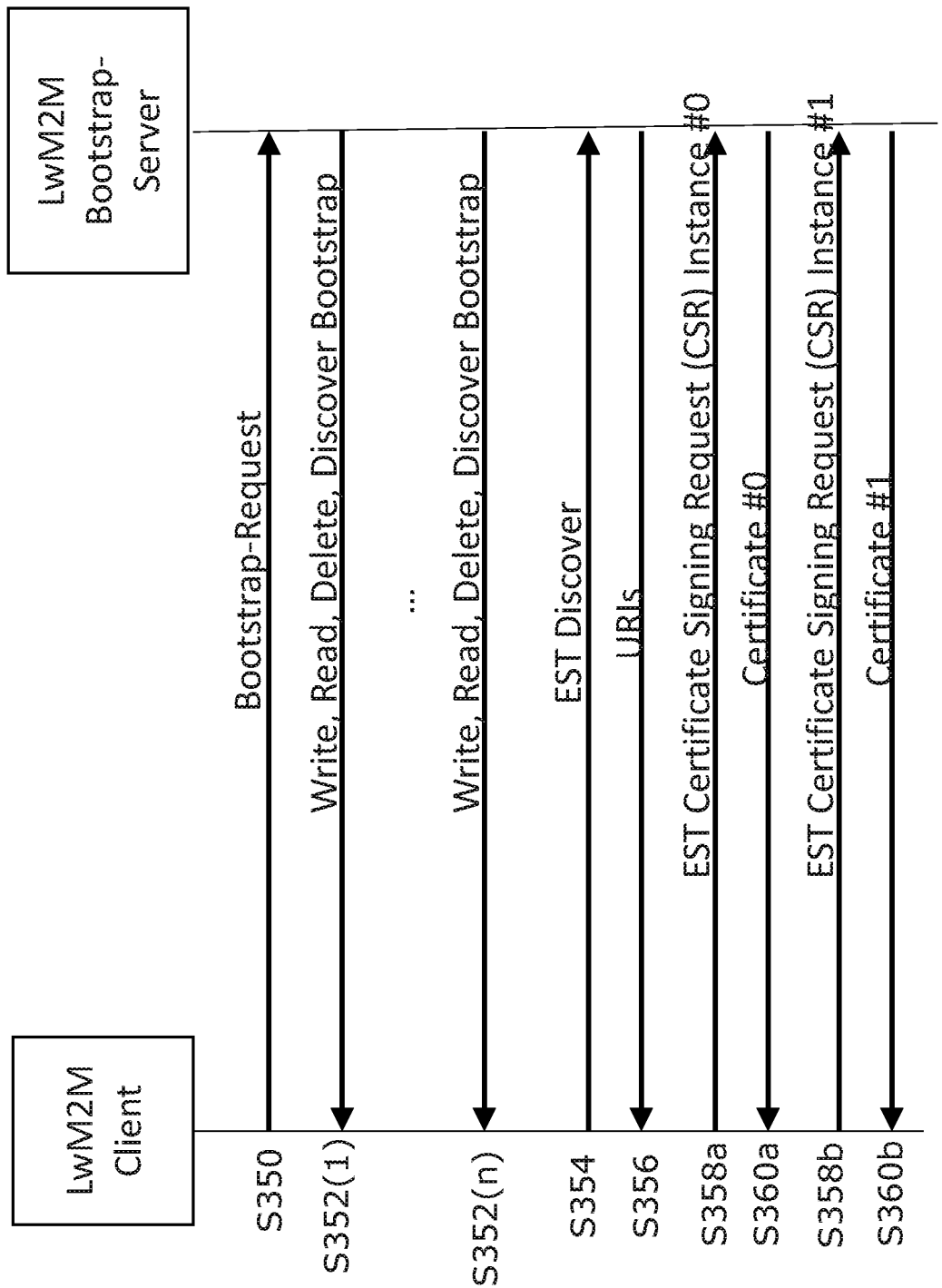
FIG. 3c shows known EST message exchanges between a client device and a Lwm2M Bootstrap server.

As depicted in FIG. 3c, which shows known EST message exchanges between a LwM2M client device and a Lwm2M Bootstrap server, the LwM2M client device sends a bootstrap request to a LwM2M bootstrap server at S350. At S352(1) to S352(n) (where 'n' is an integer), the LwM2M bootstrap server uses various operations (Write, Read, Delete, Discover) to initialize the Object(s) required by the LwM2M client device to register with one or more LwM2M Servers. At S354 the client device initiates an EST discover process with the bootstrap server, and at S356 the bootstrap server provisions the EST URIs of the LwM2M servers which the client device is to connect with.

At S358a the client device performs an EST certificate signing request (CSR) for a first URI provisioned during the EST discover and at S360a, the bootstrap server provisions a first certificate which is stored in the "Server Public Key" resource of a first Security Object instance.

At S358b the client device performs an EST certificate signing request (CSR) for a second URI provisioned during the EST discover and at S360b, the bootstrap server provisions a second certificate which is stored in the "Server Public Key" resource of a first Security Object instance.

The client device will perform an EST certificate signing request for each Server Security URI of the respective security objects.

The client device can use the provisioned certificates to establish a secure communication session with a server.

In addition to the security object instances the client device is also provisioned with one or more LwM2M Server Object instances 306 (e.g. during a bootstrap process), whereby each LwM2M Server Object instance is configured for one LwM2M server, identified by the "Short Server ID" resource therein.

Each LwM2M server object 306 provisioned on the client device is paired with one or more LwM2M Security object instances on the client device by sharing the same "Short Server ID" resource, depicted as Short Server ID="102" in FIGS. 3*a* & 3*b*.

The "Binding Preference" resource of the LwM2M Server Object 306 informs the LwM2M client device of the transport protocol preferences of the LwM2M server for the communication session between the LwM2M client device and LwM2M Server.

After the client device is turned on and the various objects/resources provisioned (e.g. following a bootstrap procedure), the client device performs a "Register" operation to each LwM2M Server for which the client device has a Server Object instance provisioned thereon, whereby the client device uses the pre-provisioned Server Security URIs of the different security object instances to establish secure communications with each of the servers in accordance with the different connection options to the server.

As is evident from FIG. 3a, the server Server Security URI resource for security object 302 is coaps://foo.example.com which specifies the address of the server identified in the paired Server Object 306 as a Fully Qualified Domain Name (FQDN) "foo.example.com" and specifies the security binding the client device must use to establish secure communications with the server (i.e. CoAP over DTLS over UDP).

The Server Security URI resource for security object 304 is coaps+tcp://foo.example.com which specifies the address of the server identified in the paired Server Object 306 as a FQDN "foo.example.com" and specifies the security binding the client device must use to establish secure communications with the server (i.e. CoAP over TLS over TCP).

As is evident in FIG. 3b, the Server Security URI resource for security object 308 is coaps://foo.example.com which specifies the address of the server identified in the paired Server Object 312 as a Fully Qualified Domain Name (FQDN) "foo.example.com" and specifies the security binding the client device must use to establish secure communications with the server (i.e. CoAP over DTLS over UDP).

The Server Security URI resource for security object 310 is coaps+tcp://foo.example.com which specifies the address of the server identified in the paired Server Object 312 as a FQDN "foo.example.com" and specifies the security binding the client device must use to establish secure communications with the server (i.e. CoAP over TLS over TCP).

As described above, the client device uses the credential data in the respective security object instances provisioned thereto to establish secure communications with a server.

When first registering with a server, the client device initiates a handshake (e.g. TLS/DTLS handshake) with the server in accordance with the security binding defined in the Server Security URI resource The credential data used by the client device and the LwM2M server to secure the communications therebetween are obtained e.g. during the bootstrap process, whereby the credential data (E.g. raw public keys of the client device or server; private keys of the client device; certificate(s) of the client device or server) is stored as one or more resources at the respective Security Object Instances provided per connection option to the server. Credential data used by the client device and the LwM2M server to establish the secure communications session therebetween may also be obtained during or after the handshake.

The content of the resources in the respective LwM2M Security Object instances is dependent on the security protocols to be used in the client device-server communications as specified in the LwM2M Server Security URI.

As is evident from FIGS. 3a and 3b, although the Server Security URI resource is different for each security object instance so as to specify the security protocols to be used, some or all of the other resources of the security object instances (e.g. the security credentials such as the Public Key or Identity; Server Public Key; Secret Key) may be the same. For example, the private key of the client device will be the same regardless of the security protocol but will be stored in all security object instances requiring the private key. Similarly, the server public key will be the same regardless of the security protocol but will be stored in all security object instances requiring the server public key.

Thus, there is duplication of much of the resources across some or all of the security object instances on the client device, and the amount of data required to be stored at, generated by and/or transmitted to the client device increases as the number of security object instances provisioned on the client device increases.

Generating and storing information per security object instance, where each security object instance is provided for each connection option supported by the client device may be burdensome for the client device (e.g. power, storage, communications considerations) especially for constrained devices because the client device will have to send the same credential data every time it registers with the server over a different protocol.

Such functionality may also be burdensome on a bootstrap server that provisions the resources on the client device because the bootstrap server must provision the security object and the respective resources (e.g. credential data) for each connection option.

Such functionality may also be burdensome on an LwM2M server with which the client device registers because the LwM2M server has to send credential data to the client device for every security binding used by the client device.

Such functionality may also be burdensome on one or more networks through which the client device and the server communicate (e.g. reduced bandwidth due to the amount of data being transmitted).

In an embodiment rather than provisioning a client device with individual security object instances per connection option to a server, there is provided a single security object 400 which a client device can use to securely communicate with a server in accordance with two or more connection options (e.g. two or more security bindings).

Figure 4A:
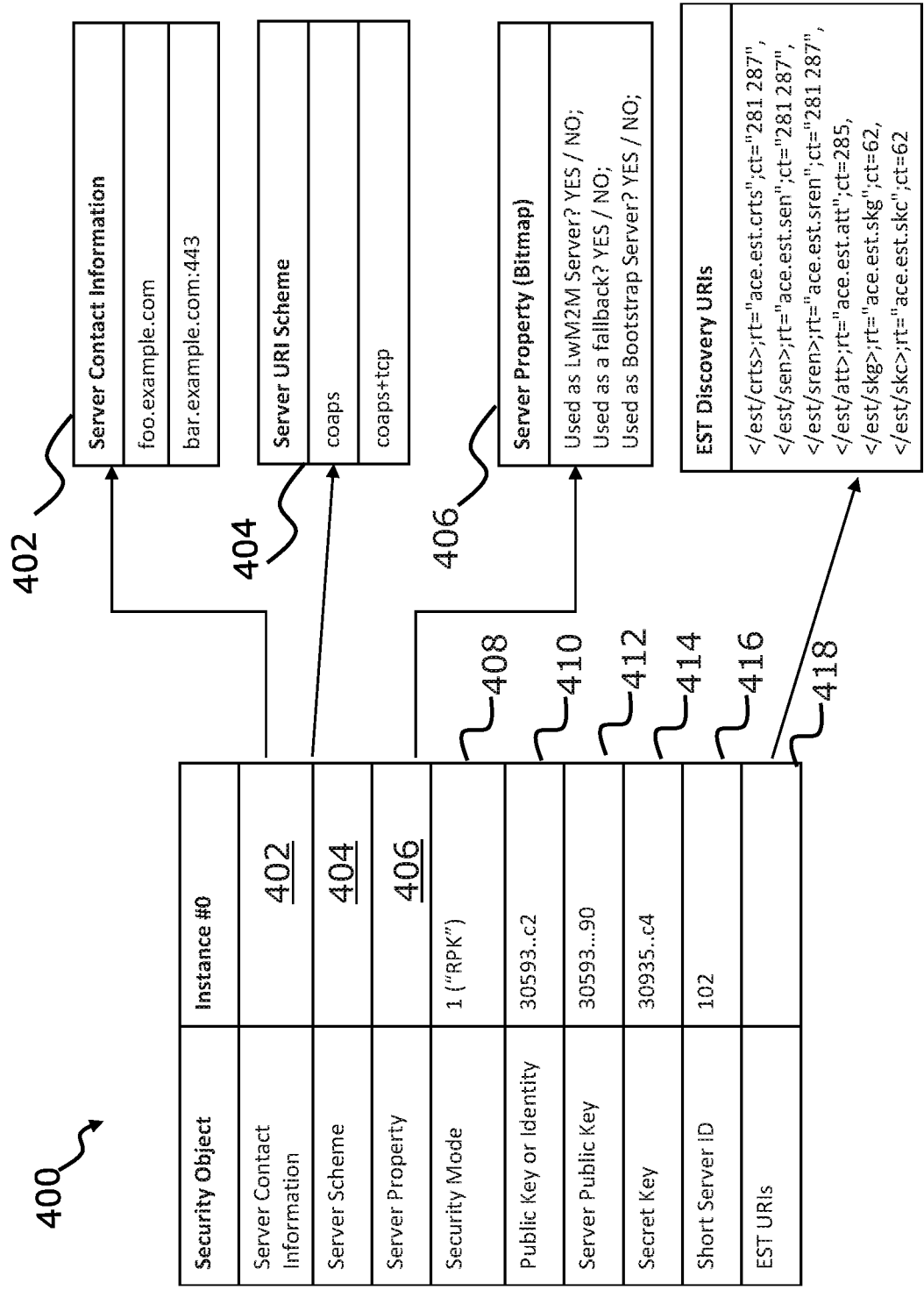
FIG. 4a shows an illustrative example of a security object according to an embodiment.

FIG. 4a shows an illustrative example of a security object 400 according to an embodiment, whereby a client device can use the security object 400 to communicate with a server in accordance with multiple connection options.

The security object 400 comprises a structure having various fields 402-418 to store the resources necessary to securely communicate with a server for each connection option to the server, although the claims are not limited to the particular structure depicted in FIG. 4.

Field 402 includes server connection data comprising one or more "Server Contact Information" (SCI) resources, each identifying a location or address of the server. A first SCI resource is the FQDN "foo.example.com" whilst a second comprises FQDN and port number "bar.example.com:443". It will be appreciated these SCI resources depicted in FIG. 4a are exemplary only and any suitable identifier may be used to identify the location or address of the server (e.g an SMS value, internet protocol (IP) address etc).

Field 404 includes server connection data comprising one or more "Server URI Scheme" resources to specify one or more security bindings for communications with the server. The security bindings in FIG. 4a are depicted as a CoAP+DTLS and CoAP+TLS+TCP. It will be appreciated that the types of the Server URI Scheme resources depicted in FIG. 4a are exemplary only.

Field 406 includes server connection data comprising one or more "Server Property" resources each depicted as being separated by a delimiter character, whereby each Server Property resource comprises a value(s) specifying one or more server properties. The one or more server properties may include, for example, a server type, a functionality(ies) supported by the server, a server capability(ies), a server characteristic(s). The client device can determine whether or not to communicate with the server on the basis of the value in the "Server Property" field. For example the server property field may specify that that the server can be used as a bootstrap server, and the client device will only attempt to bootstrap with that server. In a further example the server property field may specify that that the server is a fallback server, and the client device will only attempt to communicate with the fallback server if communications to a bootstrap or another server with which it is registered fail.

The value in field 406 may comprise one or more characters, one or more integer values, one or more floating-point values, one or more Boolean values etc. although the claims are not limited in this respect. In an embodiment the server properties may be represented as a bitmap.

The "Security Mode" resource field 408, "Public Key or Identity" resource field 410, "Server Public Key" resource field 412, "Secret Key" resource field 414 and "Short Server ID" resource field 416 each comprise credential data which can be populated at manufacture (e.g. a factory bootstrap), by the client device, by the bootstrap server and/or by another server (e.g. LwM2M server). For example the bootstrap server may provision the credential data in accordance with the Server URI schemes resources.

EST URI resource field 418 stores URIs, each depicted as being separated by a delimiter character, depicted as ',', for communicating with a server over different protocols which may be provisioned, for example, by a bootstrap server resulting from an EST discovery process during EST or which may be generated by the bootstrap server without EST discovery.

As described above, in contrast to known security objects that each have a single preset Server Security URI which the client device uses to communicate with a server, embodiments of the present technology provide that a client device can generate a Server Security URI by selecting a Server Contact Information resource (e.g. foo.example.com) and a server URI scheme resource (e.g. coaps+tcp) from the server connection data. The client device can then communicate with the server using the resulting Server Security URI (coaps+tcp://foo.example.com).

Thus, rather than having to store individual security object instances for every connection option, the client device may store a single security object and select resources from the server connection data of the security object to generate an appropriate Server Security URI in accordance with the connection option to be used (e.g. in accordance with the security protocol).

The client device also uses the credential data from resource fields 410-418 to establish secure communications with the sever in accordance with the security protocols specified in the Server Security URI.

As will be appreciated, the communications between the client device and server will be substantively the same as described above in relation to FIGS. 3a and 3b, but the process in which the client device obtains the Server Security URI for the communications will be different. For example, using the known security object instances of FIGS. 3a and 3b the client device will use a preset Server Security URI in the security object, whereas using the present technology the client device will generate the Server Security URI by selecting two or more resources from server connection data of the security object 400.

In an embodiment the appropriate connection option, and, therefore, the resources of the Server Security URI to be selected for communication with a server, is determined using an algorithm based on or in response to a rule or policy employed by the client device (e.g. as provisioned at a factory bootstrap or subsequent bootstrap, or specified by an owner of the client device or by application developer).

For example, the client device may have to communicate with a bootstrap server and will select the appropriate server contact information and server URI scheme for the bootstrap server. In a further example, the client device may determine from a server object that a particular server does not support TLS and will therefore select a server URI scheme which the particular server does support. In a further example an attempt to contact a server using UDP as a preferred connection option may fail and the client device will select a Server Security URI requiring TCP in accordance with a second connection option. In a further example, the client device will not use a particular security binding when a power level or memory storage level is below a threshold level. Thus, the Server Security URI generated by the device may be determined dependent on the performance or characteristics of the client device or server.

In a further embodiment, the Server Security URI generated by the device may depend on the underlying transport which the client device uses to communicate with the server. For example, when the client device uses WiFi then a Server Security URI specifying TCP may be preferable, whilst for N B-IOT CoAP protected by DTLS over non-IP transport may be preferable and the client will select resources and generate the Server Security URI accordingly.

The client device will, when communicating with the server, send any further resource required to establish secure communications in accordance with, for example, the security protocol used (e.g. credential data such as one or more security credentials). Similarly, the server with which the client device is communicating may also write information (e.g. credential data such as one or more security credentials) to the security object.

As will be appreciated, the storage requirements for the client device may be reduced when storing a single security object from which the client device can select server credential data to generate a Server Security URI and use credential data provisioned therein in comparison to having to store an individual security object instance per connection option to the server.

Furthermore, the number of communications that have to be exchanged between a client device and server may be reduced when storing a single security object from which the device can select server credential data to generate a Server Security URI and use credential data provisioned therein, in comparison to having to store an individual security object instance per connection option to a server because the credential data (e.g. a security credential such as a public key of the client device; public key of the server etc.) only has to be written to the corresponding resource in the single security object, and will not be required to be written to multiple security object instances per connection option (e.g. per security binding).

Although only one security object 400 is depicted in FIG. 4a, it will be appreciated that the client device may be provisioned with two or more security object instances to enable the client device to communicate with different servers in a secure manner.

Furthermore, the claims are not limited to the particular structure or fields depicted in FIG. 4a and a different structure or fields may be provided to enable the client device to communicate with one or more servers in a secure manner.

Figure 4B:
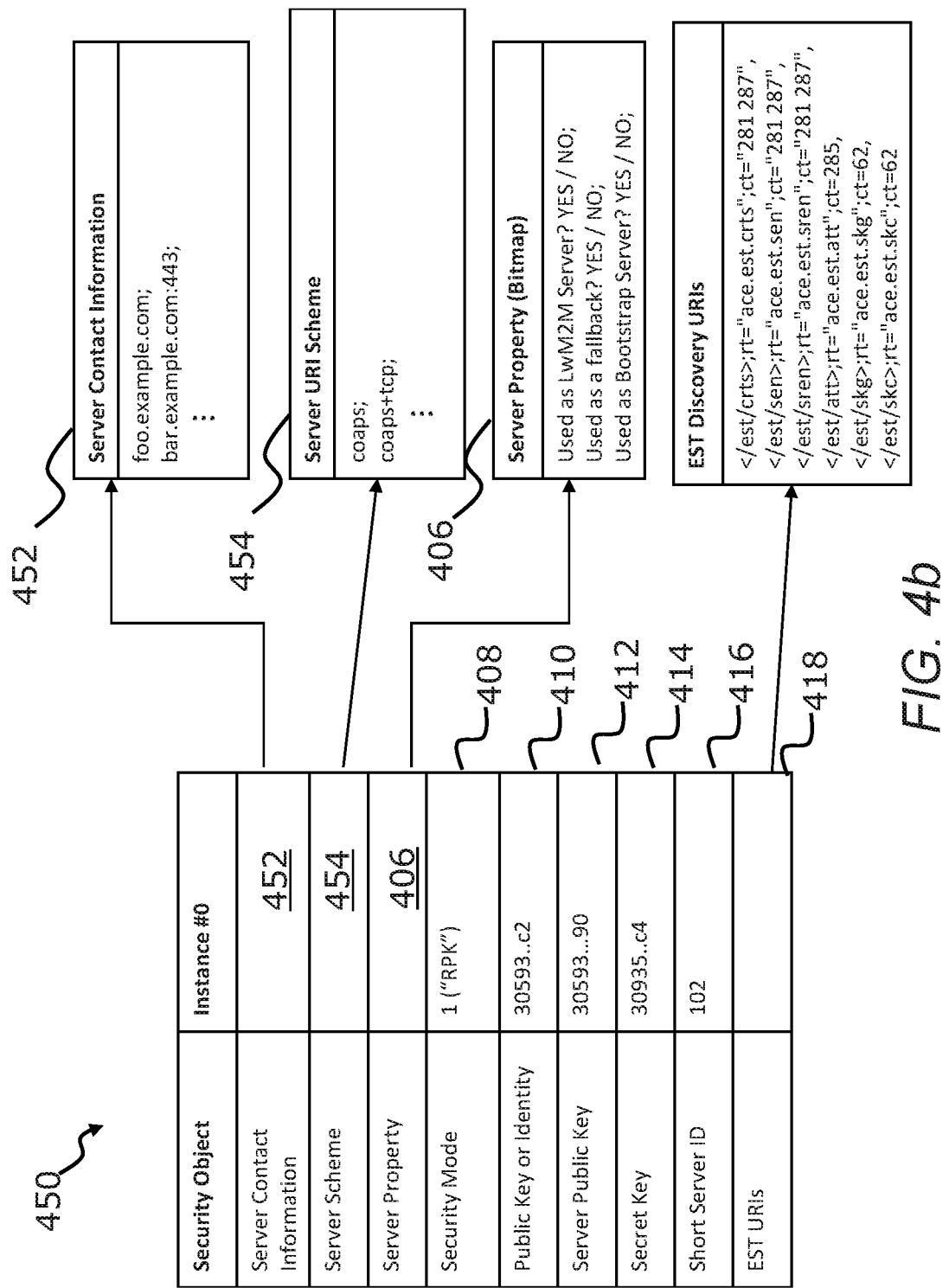
FIG. 4b shows an illustrative example of a security object according to an embodiment.

In an illustrative example, FIG. 4b shows a security object 450 according to an embodiment, whereby a client device can use the security object 450 to communicate with a server using different connection options (e.g. different security bindings).

The security object 450 comprises a structure having various fields 452, 454 and 406-418 to store the resources necessary to securely communicate with a server for multiple connection options. It will be appreciated that the resources depicted in fields 406-418 are substantially similar to those described above in FIG. 4a.

Field 452 includes server connection data comprising one or more "Server Contact Information" (SCI) resources identifying a location or address of the server. A first SCI resource is the FQDN "foo.example.com" whilst a second comprises FQDN and port number "bar.example.com:443". In FIG. 4b the different SCI resources are depicted as being separated by a delimiter character, depicted as ';', although any delimiter character may be used.

It will be appreciated the addresses shown in FIG. 4b are exemplary only and any suitable identifier may be used to identify the location or address of the server (e.g an SMS value, internet protocol (IP) address etc).

Field 454 includes server connection data comprising one or more "Server URI Scheme" resources to specify the security bindings which the server supports. The security bindings in FIG. 4a are depicted as a CoAP+DTLS and CoAP+TLS+TCP. In FIG. 4b the different SCI resources are depicted as being separated by a delimiter character, depicted as ';', although any delimiter character may be used.

It will be appreciated that the types of the Server URI Scheme resources depicted in FIG. 4b are exemplary only.

In a further illustrative example, one or more of the resources in the security object (e.g. server connection data; credential data) may be provided as an array (e.g., [["https", "coaps", "coaps+tcp"], "foo.example.com", "bar.example.com:443"]. The client device could then select a Server Contact Information resource (e.g. foo.example.com) and a server URI scheme resource (e.g. coaps+tcp) from the server connection data of the array.

In contrast to known security objects that each have a single preset Server Security URI and each further duplicate the credential data which the client device uses to communicate with a server, embodiments of the present technology provide that a client device can generate a Server Security URI by selecting a Server Contact Information resource (e.g. foo.example.com) and a server URI scheme resource (e.g. coaps+tcp) from the server connection data. The client device can then communicate with the server using the resulting Server Security URI (coaps+tcp://foo.example.com). The client device can also use the credential data in the security object to communicate with the server for different communication options.

Thus, rather than having to store individual security object instances for every security binding (e.g. as depicted in FIGS. 3a and 3b), the client device may store a single security object and select the appropriate resources from the server connection data of the security object to generate an appropriate Server Security URI. The client device also uses at least one security credential of the credential data depicted at 410-418 to establish secure communications with the sever in accordance with the security protocols specified in the Server Security URI.

Figure 5:
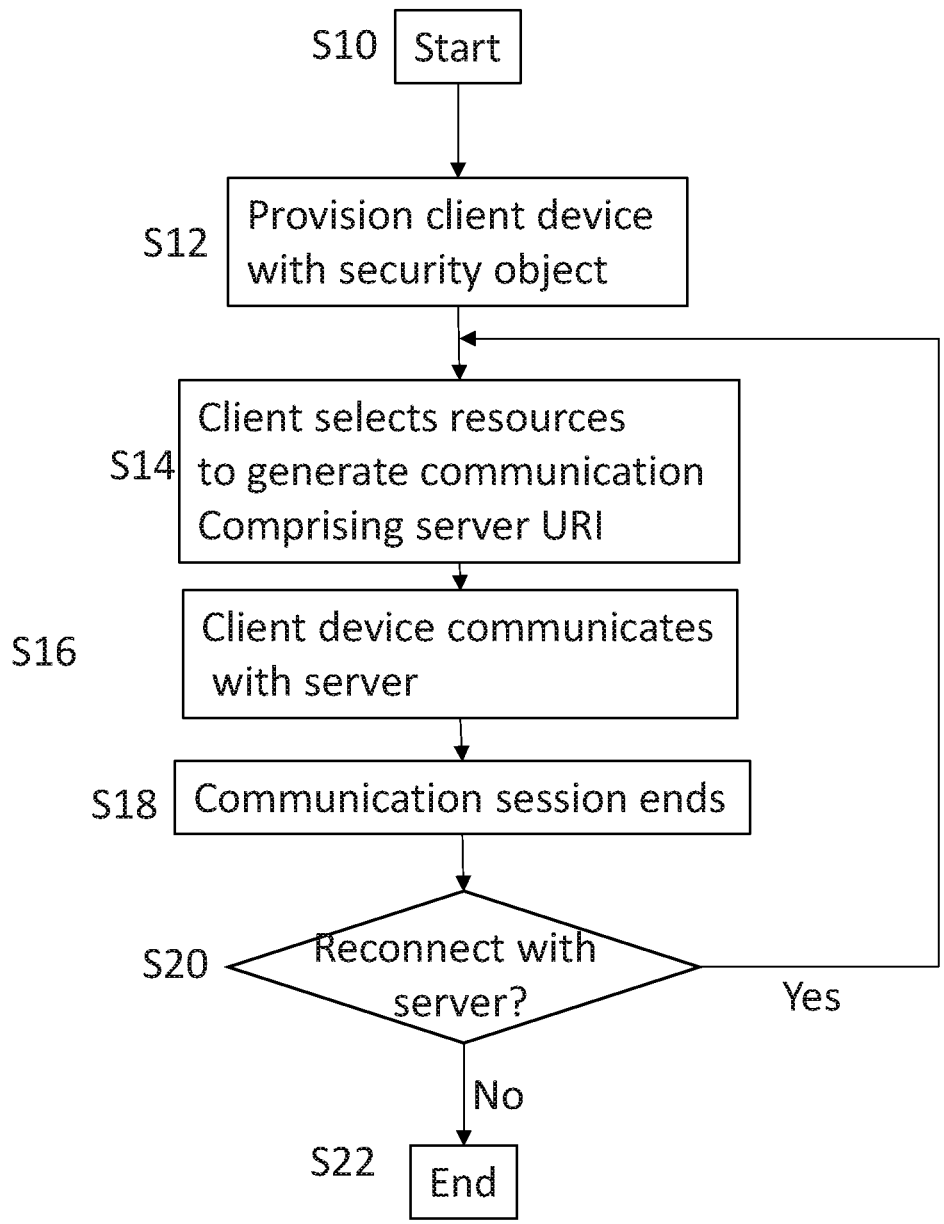
FIG. 5 shows a flow diagram of an example process of a client device generating a communication to establish a secure communication session with a server.

FIG. 5 shows a flow diagram of an example process of a client device generating a communication to establish a secure communication session with a server.

At S10 the process starts.

At S12 the client device is provisioned with a security object as described above in FIGS. 4a-c. The security object may be paired with a corresponding server object provisioned on the client device. Such provisioning may be performed by a bootstrap server.

At S14 the client selects resources from server connection data of the security object to generate a communication comprising a first Server Security URI with which to establish a secure communication session with a server as at S16. The first Server Security URI may be generated by the device by selecting a Server Contact Information resource and a Server URI Scheme resource from the server connection data in the security object for a connection option to the server in accordance with an algorithm based on or in response to a rule or policy. The communication may further comprise at least one security credential such as a public key of the client device as required for a particular security protocol.

At S18 the secure communication session between the client device and the server ends. For example, the communication session may have expired, or a maximum data transfer threshold reached.

At S20 the client device determines whether or not to reconnect with the server. When, the determination is to connect to the server the client device will select various resources from server connection data of the the security object to generate a communication comprising a second Server Security URI (as at S14) to establish a secure communication session with a server (as at S16). It will be appreciated that the second server URI may be the same as the first Server Security URI when the same connection option to the first server is used (e.g. when the same protocols (e.g. transport/application/security) are used). The communication may further comprise credential data as required for a particular security protocol.

When the determination is to not connect to the server the process ends (as at S22).

The present technology provides support for different security protocols when the client device communicates with the same sever whilst reducing the amount of credential data required to be provisioned on a client device e.g. where a client device can use CoAP over TLS over TCP to establish secure communications with the server; or may use CoAP over DTLS over SMS or HTTP over TLS over TCP to establish secure communications with the same server.

The security bindings described above are exemplary only and any suitable security bindings may be used such as: MQTT over TLS over TCP; MQTT-SN (sensor networks) over DTLS over UDP, CoAP over DTLS over LoRaWAN, CoAP over DTLS over NB-IOT, CoAP over WebSockets over TLS.

The security binding may also include bindings for OSCORE (Object Security for Constrained RESTful Environments) and/or Ephemeral Diffie-Hellman Over COSE (EDHOC), such as CoAP protected by OSCORE/EDHOC over UDP, CoAP protected by OSCORE/EDHOC over TCP, CoAP protected by OSCORE/EDHOC over LoRaWAN, CoAP protected by OSCORE/EDHOC over NB-IOT.

The security bindings may also include bindings for Application Layer Transport Security such as CoAP protected by ATLS over UDP, CoAP protected by ATLS over TCP, CoAP protected by ATLS over LoRaWAN, CoAP protected by ATLS over NB-IOT, MQTT protected by ATLS over TCP, MQTT-SN protected by ATLS over UDP.

In particular, the present technology means that a single security object can be provisioned on a client device, and the client device can select server contact information identifying a location or address of the server and a security binding from the server connection data of the security object to generate a Server Security URI to communicate with the server, whereby the server contact information and security binding may be selected for a connection option dependent on one or more properties of the client device, one or more properties the server, one or more properties the network(s) through which client device and server communicate and/or one or more security protocols required to be used for the secure communications.

The present technology also means that the credential data required for secure communications for each different connection option to the server is provisioned in the same security object rather than having to duplicate the credential data in different instances of the security object per connection option (e.g. per security binding) as done in known LwM2M systems.

Figure 6:
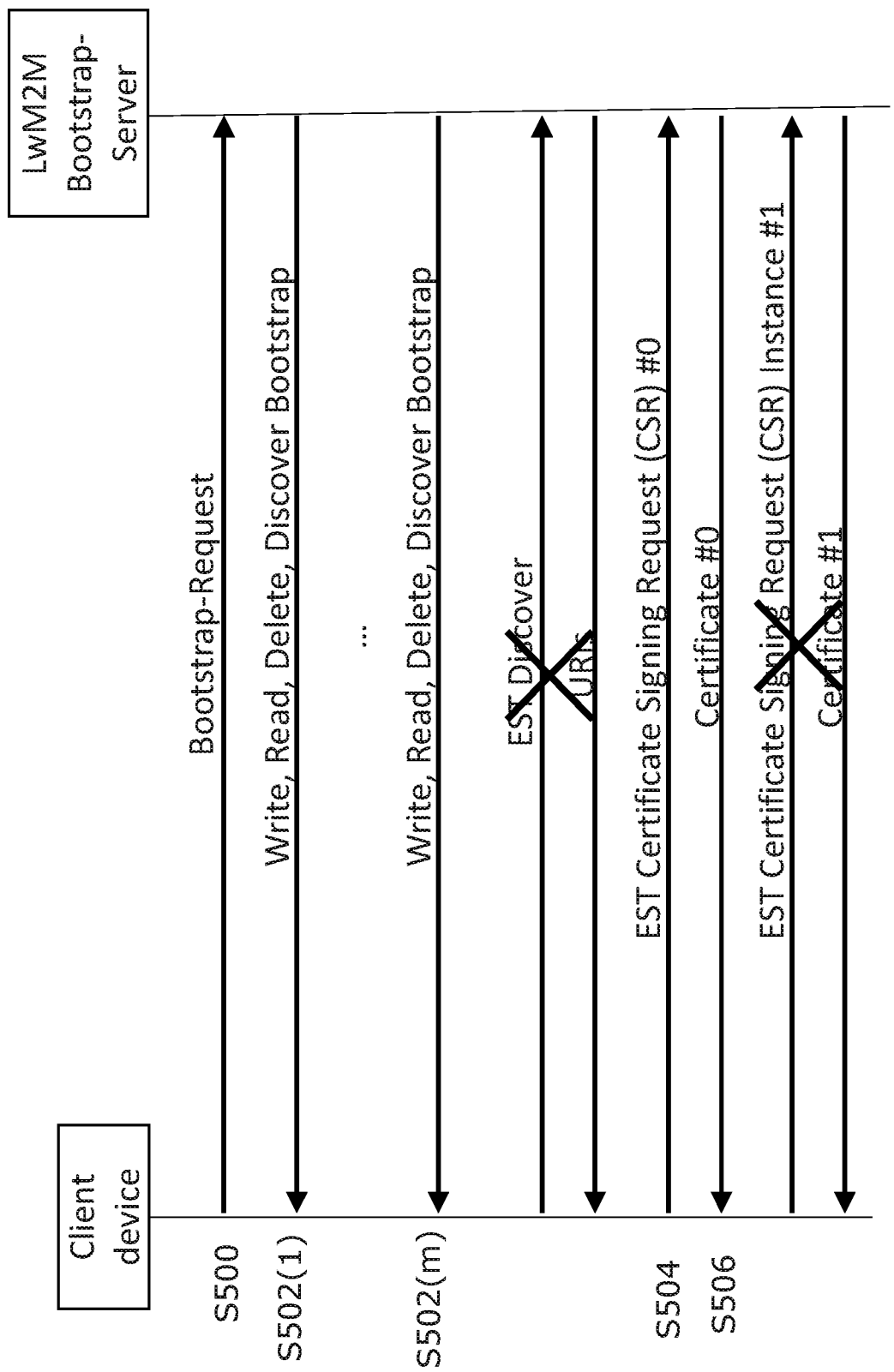
FIG. 6 shows EST message exchanges between a client device and a Lwm2M Bootstrap server according to an embodiment.

As depicted in FIG. 6 which illustratively shows EST message exchanges between a client device and a Lwm2M Bootstrap server in accordance with an embodiment.

At S500 the LwM2M client device sends a bootstrap request to a LwM2M bootstrap server. At S502(1) to S502(m) (where 'm' is an integer), the LwM2M bootstrap server uses various operations (Write, Read, Delete, Discover) to initialize the Object(s) required by the LwM2M client device to register with one or more LwM2M Servers.

In an embodiment and in contrast to the known process depicted in FIG. 3c, the bootstrap server is aware of the URI(s) the client device requires for EST, and so provisions the client device with the URIs at the "EST Discovery URIs" resource in the security object during S502(1) to S502(m). Thus, the client device is not required to send communications to the LwM2M bootstrap server to request EST discovery. Such functionality minimizes the number of communications exchanged with the bootstrap server.

At S504 the client device generates an EST CSR for a URI provisioned by the bootstrap server and the sends the CSR to the bootstrap server. At S506, the bootstrap server provisions a security credential comprising a certificate which is stored in the "Server Public Key" resource of the Security Object.

In an embodiment and in contrast to the known process depicted in FIG. 3c, the client device can use the certificate stored in the "Server Public Key" resource to establish a secure communication session with a server for each of the Server Security URIs generated by the client. Thus, the client device does not have to store multiple certificates for the same server. Although the server 4 above is generally described as a LwM2M server, the claims are not limited in this respect and in embodiments the server 4 may be an OMA Device Management (DM), a TR-069 server or a server which follows a standard/protocol set by the Open Connectivity Foundation or Open Interconnect Consortium.

Embodiments of the present techniques may provide implementations which conform to the Open Mobile Alliance Lightweight Machine to Machine Technical Specification, Version 1.0 and to one or more revision(s) thereof, including, for example, Versions 1.0.2, 1.1 and 1.3. It will be appreciated that the claims are not limited in this respect.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A computer implemented method for establishing a secure communication session between a client device and a server, the method performed at the client device comprising:
    obtaining a security object comprising a security credential and server connection data for multiple connection options to the server, wherein the security credential is to be used for each of the multiple connection options;
    selecting, from the server connection data, first server contact information and a first server URI scheme to generate a first server security universal resource identifier (URI);
    communicating with the server using the first server security URI and the security credential to establish a secure communication session between the client device and the server.

2. The method of claim 1, wherein the connection data comprises one or more server contact information resources and one or more server URI scheme resources.

3. The method of claim 2, wherein a server contact information resource is to identify the location or address of the server.

4. The method of claim 2, wherein the server contact information resource comprises one or more of: a fully qualified domain name; a port number; an internet protocol address and a Short Message Service value.

5. The method of claim 1, wherein a server URI scheme resource is to specify a security binding for communication with the server.

6. The method of claim 5, wherein the security binding specifies security protocol details to establish the secure communication session.

7. The method of claim 5, wherein the security binding specifies one or more further protocol details to establish the secure communication session.

8. The method of claim 7, wherein the one or more further protocol details comprise one or more of: transport protocol details and application protocol details.

9. The method of claim 1 wherein selecting, from the server connection data, first server contact information and a first server URI scheme to generate a first server security universal resource identifier (URI); comprises:
    selecting the first server contact information and the first server URI scheme using an algorithm based on or in response to a rule or policy.

10. The method of claim 1, wherein the server connection data specifies one or more properties of the server.

11. The method of claim 1, wherein communicating with the server using the first server security URI to establish a secure communication session between the client device and the server comprises:
    performing a handshake with the server.

12. The method of claim 1, further comprising:
    receiving credential data from the server; and
    authenticating the server based on or in response to the received credential data.

13. The method of claim 1, further comprising:
    selecting, from the server connection data, second server contact information and a second server URI scheme to generate a second server security universal resource identifier (URI);
    communicating with the server using the second server security URI and the security credential to establish a secure communication session between the client device and the server.

14. The method of claim 13 wherein the first Server Security URI and second Server Security URI are the same or wherein the first Server Security URI and second Server Security URI are different from one another.

15. The method of claim 1, wherein the client device is a lightweight machine to machine (LwM2M) device.

16. The method of claim 1, wherein the server is a LwM2M server and/or wherein the second server is a bootstrap server.

17. A computer implemented method for establishing a secure communication session between a client device and a server, the method performed at the server comprising:
    receiving, from the client device, a first communication comprising a first server security universal resource identifier (URI), the server security URI generated at the client device and comprising server contact information for the server and a first server URI scheme selected from server connection data on the client device;
    communicating with the client device to establish a secure communication session between the server and the client device.

18. A non-transitory computer readable storage medium comprising code which when implemented on a processor causes the processor to carry out the method of claim 1.

19. A device comprising:
    processing circuitry;
    storage circuitry; and
    communication circuitry;
    and wherein the device is to perform the method of claim 1.

20. A system comprising:
    a device; and
    a server;
    wherein the device is to perform the method of claim 1.

* * * * *